(12) United States Patent
Björkner

(10) Patent No.: US 7,912,504 B2
(45) Date of Patent: Mar. 22, 2011

(54) ALTERNATIVE ROUTING

(75) Inventor: Jörgen Björkner, Hägersten (SE)

(73) Assignee: Telepo AB, Stockholm (SE)

( * ) Notice: Subject to any disclaimer, the term of this patent is extended or adjusted under 35 U.S.C. 154(b) by 1205 days.

(21) Appl. No.: 11/320,476

(22) Filed: Dec. 29, 2005

(65) Prior Publication Data

US 2006/0172772 A1    Aug. 3, 2006

Related U.S. Application Data

(60) Provisional application No. 60/640,062, filed on Dec. 30, 2004.

(51) Int. Cl.
H04B 1/38 (2006.01)

(52) U.S. Cl. ........ 455/558; 455/428; 455/445; 455/432; 370/351

(58) Field of Classification Search .................. 455/558, 455/428, 445, 432.1, 419, 517; 370/351, 370/228, 238, 248
See application file for complete search history.

(56) References Cited

U.S. PATENT DOCUMENTS

| | | | | |
|---|---|---|---|---|
| 6,484,026 B1 * | 11/2002 | Hagebarth | ..................... | 455/419 |
| 6,591,098 B1 * | 7/2003 | Shieh et al. | .................... | 455/419 |
| 6,725,155 B1 * | 4/2004 | Takahashi et al. | ............ | 701/209 |
| 6,741,848 B2 * | 5/2004 | Timonen et al. | .............. | 455/405 |
| 6,772,219 B1 * | 8/2004 | Shobatake | ..................... | 709/238 |
| 6,856,818 B1 * | 2/2005 | Ford | ................................ | 455/558 |
| 6,868,391 B1 * | 3/2005 | Hultgren | .......................... | 705/26 |
| 6,912,222 B1 * | 6/2005 | Wheeler et al. | .......... | 370/395.31 |
| 6,975,853 B2 * | 12/2005 | Fang et al. | ..................... | 455/411 |
| 7,031,704 B2 * | 4/2006 | Di Claudio et al. | ........ | 455/432.1 |
| 7,231,203 B2 * | 6/2007 | Marcelli | ........................ | 455/411 |
| 7,269,157 B2 * | 9/2007 | Klinker et al. | ................ | 370/351 |
| 7,269,247 B2 * | 9/2007 | Mashinsky | ................. | 379/88.14 |
| 7,389,105 B2 * | 6/2008 | Ala-Laurila et al. | .......... | 455/406 |
| 7,389,119 B2 * | 6/2008 | Weigele | ......................... | 455/517 |
| 7,428,221 B2 * | 9/2008 | Thubert et al. | ................ | 370/255 |
| 7,512,796 B2 * | 3/2009 | Haverinen et al. | ............ | 713/168 |
| 7,577,431 B2 * | 8/2009 | Jiang | .......................... | 455/432.1 |
| 2002/0077107 A1 | 6/2002 | Eng et al. | | |
| 2002/0081179 A1 | 6/2002 | Vallstrom | | |
| 2002/0142753 A1 * | 10/2002 | Pecen et al. | .................... | 455/411 |
| 2003/0140169 A1 | 7/2003 | Einola et al. | | |
| 2003/0165227 A1 | 9/2003 | Beer | | |
| 2003/0198218 A1 | 10/2003 | Farris et al. | | |
| 2004/0033819 A1 * | 2/2004 | Hymel | .......................... | 455/567 |
| 2004/0229601 A1 | 11/2004 | Zabawskyj et al. | | |
| 2006/0069914 A1 * | 3/2006 | Rupp et al. | ..................... | 713/168 |
| 2007/0143398 A1 * | 6/2007 | Graham | ......................... | 709/204 |
| 2007/0259678 A1 * | 11/2007 | Kuk et al. | ...................... | 455/466 |
| 2008/0109331 A1 * | 5/2008 | Stadelmann et al. | ........... | 705/34 |

(Continued)

FOREIGN PATENT DOCUMENTS

EP     0 920 176 A2     6/1999

(Continued)

*Primary Examiner* — Minh D Dao
(74) *Attorney, Agent, or Firm* — Harness, Dickey & Pierce, P.L.C.

(57) ABSTRACT

The relates to means for increasing subscription transparency for mobile terminal users. An association between an identifier of a user and an identifier of a current SIM card, or a currently used logical phone, in a mobile terminal the user is using is provided. The association is sent from the mobile terminal to a communication server for use in call establishment to and from the mobile terminal.

37 Claims, 3 Drawing Sheets

U.S. PATENT DOCUMENTS

| | | | |
|---|---|---|---|
| 2008/0226054 A1* | 9/2008 | Mashinsky | 379/210.01 |
| 2008/0287113 A1* | 11/2008 | Aaltonen et al. | 455/418 |
| 2008/0288881 A1* | 11/2008 | Aaltonen et al. | 715/764 |
| 2009/0061860 A1* | 3/2009 | Jiang | 455/433 |
| 2009/0075629 A1* | 3/2009 | Simpson et al. | 455/411 |
| 2009/0124291 A1* | 5/2009 | Cha | 455/564 |
| 2009/0149175 A1* | 6/2009 | Lopresti et al. | 455/433 |

FOREIGN PATENT DOCUMENTS

| | | |
|---|---|---|
| EP | 1 035 719 A2 | 9/2000 |
| EP | 1 077 578 | 2/2001 |
| WO | WO 01/49060 A1 | 7/2001 |
| WO | WO 2004/043105 A1 | 5/2004 |

* cited by examiner

ALTERNATIVE ROUTING

CROSS-REFERENCE TO RELATED APPLICATIONS/INCORPORATION BY REFERENCE

This application makes reference to and claims priority to U.S. Provisional Application Ser. No. 60/640,062 filed on Dec. 30, 2004, which is hereby incorporated herein by reference in its entirety.

FIELD OF THE INVENTION

The invention generally relates to the area of call establishment in communication networks, and more specifically to methods and devices for increasing subscription transparency for a subscriber.

BACKGROUND ART

When setting up connections in communication networks there is generally a default route along which the connection is set up. For example, when placing a call from a mobile terminal attached to a mobile network in which a mobile terminal is roaming, the call will be set up via the network in which the mobile terminal is roaming.

The default route might not be the optimal route, e.g. in terms of cost effectiveness from the subscriber's point of view.

In prior art, this has e.g. been addressed by having a possibility of attaching the mobile terminal to another roaming network having lower prices. However, this requires the subscriber to be aware of the costs for placing calls from different roaming operators, which is cumbersome and unpractical.

Hence, in some prior art location based routing have been suggested, where a mobile terminal is provided with routing information and connections are established between the terminal and another terminal based on the location of the mobile terminal and the routing information dependent of the location of the terminal.

However, problems still remain, as location based routing generally requires alteration of call control functions in the communication devices in which it is to be implemented.

Hence, there is a need for location based routing which can be implemented in communication devices without the need to alter the call control functions in the communication devices.

Furthermore, the utilization of multiple local subscriber identity module (SIM) cards has also been suggested, i.e. allowing the use of local mobile subscriptions belonging to the network where the user currently is present. The advantage of using local SIM cards is that there is no extra charge (roaming charge) added to the call setup cost, and no extra cost of receiving calls, which is the case if the users home network SIM card would be used. Typically the rates of placing national calls also are much more beneficial if a local SIM card is used. Alternatively a dual mode telephone, i.e. a single device which logically includes two different phones which may each be attached to a different network, may be used instead of two SIM cards to avoid high calling costs. For example a dual mode mobile terminal may be a mobile terminal with GSM and Wireless LAN capabilities may be used.

A problem of using a local SIM card or dual mode phones is that each SIM card or logical phone in a dual mode phone is associated with a phone number to be used to reach the phone where the SIM card is used or logical phone is active. This means that if a user switches SIM cards in the mobile phone or activates a logical phone, all people communicating with the user need to be made aware of this new number. Merely diverting the calls directed to the normal phone number to the phone number of the local SIM would not lead to the desired cost saving. Another problem is that when the user calls other parties an unknown calling party number will be presented to the called party, that would expect the normal phone number of the calling party to be displayed.

SUMMARY OF THE INVENTION

An object of the invention is to alleviate the problems of the prior art.

According one aspect of the invention, a mobile terminal and a method is provided for increased subscription transparency for mobile terminal users. An identification of a user of a mobile terminal is stored in the mobile terminal. An identifier of a current SIM card in the mobile terminal is detected, or the currently used logical phone of a dual mode mobile terminal. A communication is sent to a communication server. The communication indicates an association between the identifier of the user and the identifier of the current SIM card or logical mobile terminal.

The invention increases subscription transparency when using multiple local SIM cards or logical phones in dual mode mobile terminal. For example it allows the use of local mobile subscriptions belonging to the network where the user currently is present without a need for using different phone numbers. It also allows a user to place voice over IP calls using a wireless LAN if it is available. One advantage of using local SIM cards or wireless LAN is that there is no extra charge (roaming charge) added to the call setup cost, and no additional cost of receiving calls, which is the case if the users home network SIM card would be used when roaming in another network. Typically the rates of placing national calls also are much more beneficial if a local SIM card is used.

Sending an association between the identifier of the user and the identifier of the current SIM card or logical phone to a communication server facilitates a central storage in the communication server of current SIM cards and logical phones of users. This is useful e.g. in the case where the user temporary loans a specific SIM card. Calls to a default phone number of the user can be directed to the central communication server and diverted to a phone number associated with the current SIM card or logical phone in the mobile terminal used by the user.

The communication from the mobile terminal to the communication server need only comprise sufficient information to associate the user with the current SIM card or logical phone. For example, it would be enough to send an association of an identification of the user and an identification of the current SIM card, if the default phone number of the user and the phone number associated with the current SIM card, and respective associations to the identification of the user and the current SIM card is stored in the communication server. The identification of the SIM card is e.g. the international mobile subscription identity (IMSI). A logical phone may be identified using an telephone number, voice over ip address, for example a SIP address or other identifier.

In an embodiment, a routing table from the communication server is received in the mobile terminal. The routing table indicates a preferred routing for outgoing calls.

Call establishment is affected by the routing table. For example, when receiving a request to establish a call from the mobile terminal to a called phone number, the establishment of the call is normally initiated via a default route. However, if the route according the preferred routing indicated by the routing table, differs from the default route, the establishment of the call via the default route is interrupted, and the call is established according to the preferred routing indicated by the routing table. If a dual (or multi) mode phone is used the routing table also may indicate which of the logical phones to be used to set up the call. The routing table may include various number transformations to be applied on the dialed number, for example stripping or adding digits. It may also contain information on which authentication method to use to authenticate the call if an alternative route is selected. It also may contain information on how the call is to be established to the routing server by using a traditional call setup, place a call to the routing server to trigger a call-back call, use voice over IP and wireless LAN or use a data connection to the routing server to trigger a call back call. The routing table may also contain an ordered list of fallback routes and preferences among these, for example: First a wireless LAN route should be established. In case this is not possible, a route through the routing server should be used. If this is not possible the default route should be used.

In alternative, call establishment can be performed without the call establishment via the default route being initiated, i.e. by means of routing according to the preferred route indicated by the routing table directly.

In one embodiment the routing table indicates that outgoing calls from the mobile terminal should be established via the communication server.

Establishing user placed calls from the mobile terminal via the communication server is beneficial when a current SIM card is used that is associated with a phone number which differs from a default number of the user as it enables further subscription transparency. It is also useful if another logical phone is to be used. In such a case the phone number associated with the current SIM card would be a current phone number of the user. Calls placed by the user via the communication server could then be adapted in such a way that the calling party number, i.e. the users phone number, sent to the called party for presentation, is not the current number as it would be without adaptation, but the default number. If the default phone number of the user, the current phone number of the user, and an association there between are stored in the communication server, the current phone number can be replaced with the default number of the user as the call is established via the communication server.

Multiple methods of call establishment with the routing server are supported: 1) Call setup with alternative phone number, where the routing table indicates an alternative phone number to connect the call to. 2) Call setup triggered call-back, where the routing table indicates a number used to call to trigger a call-back call to be set up by the routing server to the mobile phone. 3) Use of specific logical phone, for example voice over IP phone in a dual mode phone. 4) Data connection triggered call-back where a data connection to the routing server trigger a call back call to be set up.

The invention includes a mechanism to hide the re-routing occurring for the end-user. From a user perspective the call is placed as normal, and the call is transparently re-routed in the background of the end-user. In the case of call-back connections with the routing server the invention hides this as well and automatically answers the incoming call from the routing server, the end user perceives the call setup as a normal placed call.

The detecting of the identifier of the current SIM card or logical phone may be done at any time, but is preferably done in response to the activation of the current SIM card or start of the logical phone, such as when the phone is powered on.

In one embodiment of the invention, the mobile terminal is arranged to receive two or more SIM cards. This may e.g. be a first SIM card associated with a subscription in a home network and a second SIM card associated with a subscription in a often visited network. The mobile phone is arranged to selectively activating one of two or more SIM cards in the mobile terminal for use in communication. This can be done manually by the user or automatically in response to information of the current network. In such a case, the current SIM card is the currently activated SIM card, and the determining would generally take place each time a change of currently activated SIM card occurs. The selection of SIM card to be activated can be done by considering the current location of the phone such as country and current mobile network. The same logic applies in selection of a logical phone in the case of a dual-mode phone.

According to another aspect of the invention a communication server and a method for increased subscription transparency for mobile terminal users are provided. A default phone number of a user is stored in a communication server. A communication from a mobile terminal used by a user is received and interpreted in the communication server. The communication indicates an association between an identifier of the user and an identifier of a current SIM card or logical phone in the mobile terminal. A phone number associated with the current SIM card or logical phone is stored in the communication server as a current phone number of the user.

In an embodiment, a routing table indicating a preferred routing for establishment of outgoing calls from the mobile terminal is created in the communication server based on the current SIM card or currently active logical phones in the mobile terminal. The routing table is the sent to the mobile terminal.

For a case where the current phone number of the user is different from the default phone number, outgoing calls from the mobile terminal are preferably established via the communication server. Hence, the routing table sent to the mobile terminal would then indicate a preferred routing of outgoing calls to be via the communication server.

When a call establishment request is received in the communication server from the current phone number to a called phone number, the default phone number instead of the current phone number of the user is preferably provided by the communication server to the called phone number when the call is established.

Replacing the current phone number with the default phone number provides further subscription transparency for mobile terminal user, as a call from the user to a called party would be perceived by the called party as a call from default number of the user already when the call is received.

Furthermore, a least cost route for establishing outgoing calls from the mobile terminal to a called phone number can be determined in the communication server. As an example, the routing table can comprise routing information stating that for in some cases, an outgoing call from the mobile terminal should be established via the communication server and then via the least cost route to the called phone number.

Transparency with respect to incoming calls to the user of the mobile terminal can also be increased. More specifically, an incoming call establishment request to the user of the mobile terminal directed to the default phone number of the user can be directed first to the communication server. Using the stored information regarding default and current phone number of the user, the incoming call is established to the current phone number of the user instead of the default phone number of the user.

As for outgoing calls, a least cost route can be determined in the communication server also for establishing the incoming call to the current phone number of the user.

For outgoing calls other services associated with the user may be executed by the routing server such as number translation, call policy enforcement or other call origination services.

In alternative, or as a supplement, to sending a communication indicating an association between the identifier of the user and the identifier of the current SIM card or logical phone from a mobile terminal to a communication server, an administrative system can be used. In the administrative system, information associating an identifier of the user and an identifier of a current SIM card can sent to the communication server, e.g. by personnel at a SIM card loaning centre when the user loans the current SIM card, or a system administrator.

In cases where calls are established via the communication server, e.g. when a SIM card is used which is associated with a phone number which is not the default phone number of the user, the communication server may gather statistics regarding the established calls. The statistics can be used for analysis of general call behaviour, call behaviour of specific users, for charging functionality etc.

In particular, information regarding called phone number and duration of the call, can be stored for each call established from the mobile terminal of the user using a SIM card which is associated with a phone number which is not the default phone number of the user. The information can then be associated with the user.

BRIEF DESCRIPTION OF THE DRAWINGS

In the following embodiments of the invention will be described in detailed with reference to the enclosed drawings, in which.

DETAILED DESCRIPTION

Figure 1:
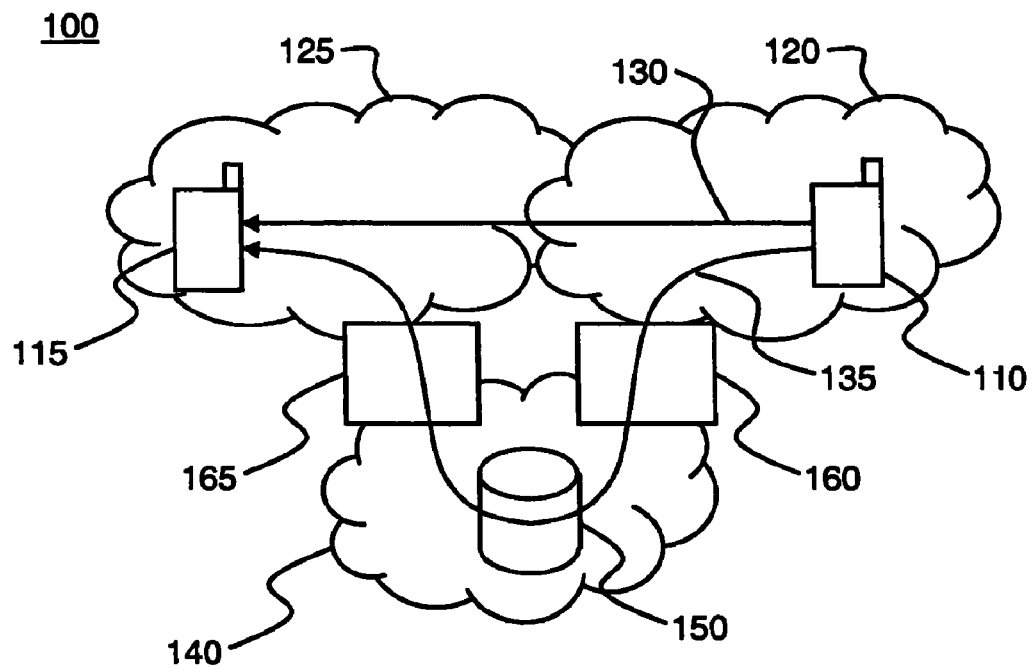
FIG. 1 shows a schematic diagram of a system in which the invention may be implemented.

Embodiments of the invention can be implemented in a system 100 as disclosed in FIG. 1.

In the system 100 there is a first mobile terminal 110 and a second mobile terminal 115. The first mobile terminal 110 is attached to a first mobile network 120, and the second mobile terminal 115 is attached to a second mobile network 125.

A call from the first mobile terminal 110 to the second mobile terminal 115, is normally routed through the first mobile network 120 and the second mobile network 125 via a normal route 130.

In addition to the normal route 130 a call from the first mobile terminal 110 to the second mobile terminal 115 can be established via an alternative route 135 through an alternative network 140 via a communication server 150 using a first gateway 160 and a second gateway 165 between the networks. The elements 150, 160 and 165 may be combined together in a single node or put in separate locations.

The alternative route may e.g. be a route which is less expensive than the default route. For example, the alternative route may be through an Internet Protocol (IP) network. In such a case the gateways 160 and 165 are between an IP network 140 and the first mobile network 120 and the second mobile network 125, respectively. If for example, the first mobile network 120 and the second mobile network 125 are in two different countries, the routing of the call through the IP network 140 for the international part of the connection would be considerably less expensive than the default route 130. The same would normally be true for the case where the second network 125 is a POTS network. The gateways can also be used to select between different trunks to use for the calls to be set up based on the routing information in the routing server 150.

The communication server 150 comprises routing information indicating presence of preferred alternative routes. The routing information is used to generate a routing table which is transmitted to the first terminal 110.

When a user of the first mobile terminal 110 places a call to the user of the second mobile terminal 115, the establishment of the call via the default route 130 is initiated through a call control logic (not shown) of the first mobile terminal 110. An alternative routing logic (not shown) receives the information that a call establishment procedure has been initiated and the routing table obtained from the communication server 150 is checked for preferred alternative routes 135. The decision on whether to use an alternative route 135 could e.g. be based on the cost of routing the call via route 130 and the cost for the alternative route 135.

The alternative routing logic may use a dial plan stored on the mobile terminal to resolve the preferred route to the destination. The plan comprises a set of rules used to express matching criteria to determine if which route should be used, alternative or default.

Input to destination queries are e.g. the destination address (called phone number), current network where the user is located and the country where the user is located. The set of rules comprises matching conditions to be used to operate on those input values. Such operands may be of the form of regular expressions. The output of the query is a potential gateway 160 (intermediate route) to be used to route the call, type of signalling to use to transfer the original destination number to such gateway 160 and type of authentication to use with the gateway 160.

The dial plan may describe several alternative routes to a destination, and contains information to allow the client to prioritize among those. Such information is price and quality parameters.

If it is determined that the alternative route 135 should be used, the client 110 will send an instruction to the call control logic, indicating that the establishment of the call via the default route 130 should be interrupted, and the call will be established through the alternative route 135.

Before setting up the call via the alternative route 135, an authorization procedure is preferably performed through the gateway 160 to the other network 140.

In alternative to first initiating the call establishment via the default route 130 and then interrupting it, the alternative routing logic can be integrated in the call control logic in such a way that the decision of using an alternative route or not is made before the establishment is initiated.

If it is not possible to set up the call via the alternative route 135, e.g. due to errors, the default route 130 is used.

The terminal 110 may be provided with authorization functionality. Furthermore, all information relating to the alternative routing may be encrypted.

One example of principle for alternative routing which can be used separately, is alternative routing in case of roaming. In this case, a number of different networks can be used for roaming. When selecting the network to use for roaming, cost information, which e.g. can be stored in the mobile terminal, for the number of networks is used together with information regarding the SIM card of the mobile terminal. The cost information can be updated, e.g. by retrieval of updates from a central communication server.

In an embodiment of the invention managing situations are managed where a user of a mobile terminal 110 can temporarily loans a SIM card which is not her/his default SIM card. The loaning of SIM cards may e.g. be provided within in a multinational organisation/enterprise, e.g. by provision of loaner SIM cards at receptions on the premises of the organisation/enterprise in each country/region or at some other suitable location, such as an air port, train station, or other central location. A benefit of the use of loaner SIM cards is that the user can use SIM cards associated with local subscriptions and hence avoid the increased cost associated with the roaming needed when using SIM cards associated with non-local subscriptions.

The mobile terminal 110 comprises an application which detects identifications of an active SIM card. Furthermore, stored on the mobile terminal 110 is also a unique identification of the user of the mobile terminal. When a user inserts a loaned SIM card in the mobile phone 110, the application in the mobile phone detects the activation of the SIM card and the identification of the SIM card, e.g. in the form of an IMSI, and automatically registers that the user can now be reached at the phone number of the loaner SIM card, by sending a communication to the communication server 150 indicating an association between the identifier of the user and the identifier (IMSI) of the SIM card.

The application further comprises alternative routing logic, which is arranged to receive, interpret and store routing information received in a routing table from the communication server 150 via a receiver in the mobile terminal 110. In the case of a loaner SIM card the routing table will normally simply indicate that all calls established from the mobile terminal 110 should be established via the communication server 150.

The communication server 150 comprises association of the user with a default phone number and an association of loaner SIM cards with respective phone numbers. When receiving a communication from the mobile terminal 110 indication the new association, the communication server 150 will update its redirect rules to forward all incoming calls to the default number of the user to the phone number associated with the loaner SIM card.

When a call is placed to the default phone number of the user, the call will be directed to the communication server 150. Because of the SIM change registration, the communication server 150 knows that the user is reached on the phone number associated with the loaner SIM card. Incoming calls are routed to the communication server 150 either because the default phone number of a user is an extension number that always routes incoming calls to the communication server 150, or that the default SIM card subscription has a call divert rule that forwards calls on no answer to the communication server 150.

When a user places a call with an active loaner SIM card, the alternative routing logic will make sure that all calls being placed is routed through the communication server 150. This server 150 will rewrite the calling party number displayed to the called party to be the default number of the user.

When the user returns the loaner SIM card and inserts the default SIM card to the mobile terminal 110, the communication server 150 is updated to route incoming calls to this number.

Furthermore, the invention may be advantageously used in connection with mobile terminals arranged to receive two or more SIM cards, and to selectively activate one of the two or more SIM cards for use in communication. In such a case SIM cards associated with different subscriptions may be manually or automatically activated in order to minimize costs. For example, SIM cards associated with subscriptions in countries often visited by the user may be inserted in the mobile terminal and selectively activated when the user visits the respective country. For this type of mobile terminals, the current SIM card is the currently activated SIM card.

Dual (or multi) mode functionality in a mobile terminal, e.g. a dual mode mobile terminal having both GSM and WLAN capability, may be used instead of or in combination with alternative SIM cards associated with different subscriptions. In such a case, in addition to the selection of routing through the default route 130 in the system 100, the connection to the gateway 160 may be alternatively done either via a GSM network or via a WLAN network. Such an alternative connection may be selected dynamically at call set up by means of information in the routing table.

Figure 2:
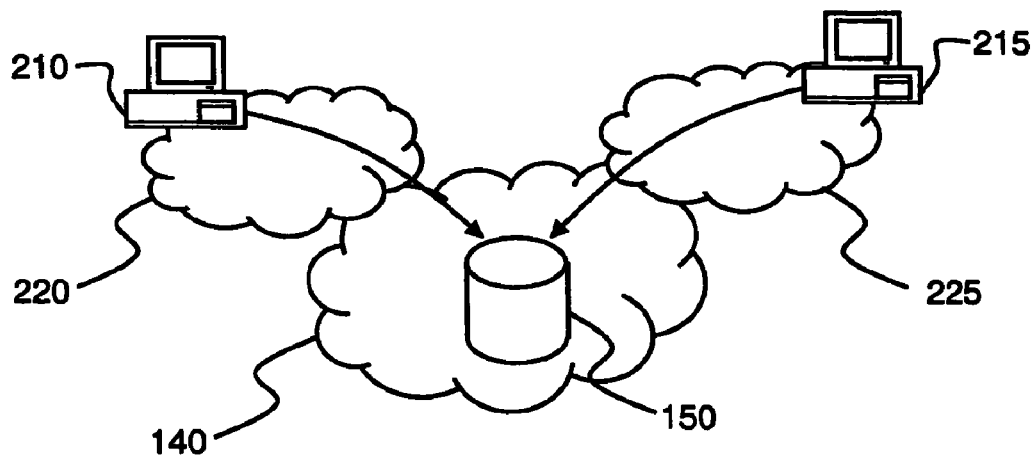
FIG. 2 shows a schematic diagram of another system in which the invention may be implemented.

Embodiments of the invention can also be implemented in a system 200 as disclosed in FIG. 2.

In alternative, or as a supplement to the sending of the association of an identification of a user and an identification of a SIM card, a SIM inventory management system 200 as shown in FIG. 2 can be used. The system is used to manage parameters such as:

Service provider information
Location information of subscription
Subscription mobile phone number
SIM card IMSI number The inventory management system can be web provisioned by personnel responsible of the management of the physical loaner SIM cards. The information is stored in the communication server.

When a user arrives, in for example a new country, a loaner SIM card can be picked up at one of a number of loaner SIM card receptions. The receptions have computers 210, 215 which are connected to a respective local network 220, 215 which in turn is connected to a network 140 in which a communication server 150 is present. The personnel at the reception have access to the communication server and updates the information in the communication server 150 with the identification of the SIM card the user receives and an identification of the user and updates this. This allows the communication server 150 to keep track of a current association between users and SIM cards.

As all calls to and from the mobile terminal 110 of the user will be routed via the communication server 150 when the user uses a loaner SIM card, the communication server 150 is preferably also provided with call statistic gathering functionality. The statistics can be used for analysis of general call behaviour, call behaviour of specific users, for charging functionality etc.

Similarly, when a user activates a logical phone of a dual (or multi) mode mobile terminal, the communication server 150 is provided with an identification of the user and an identification of the currently used logical phone. All calls to and from the mobile terminal may then be routed via the communication server.

Figure 3:
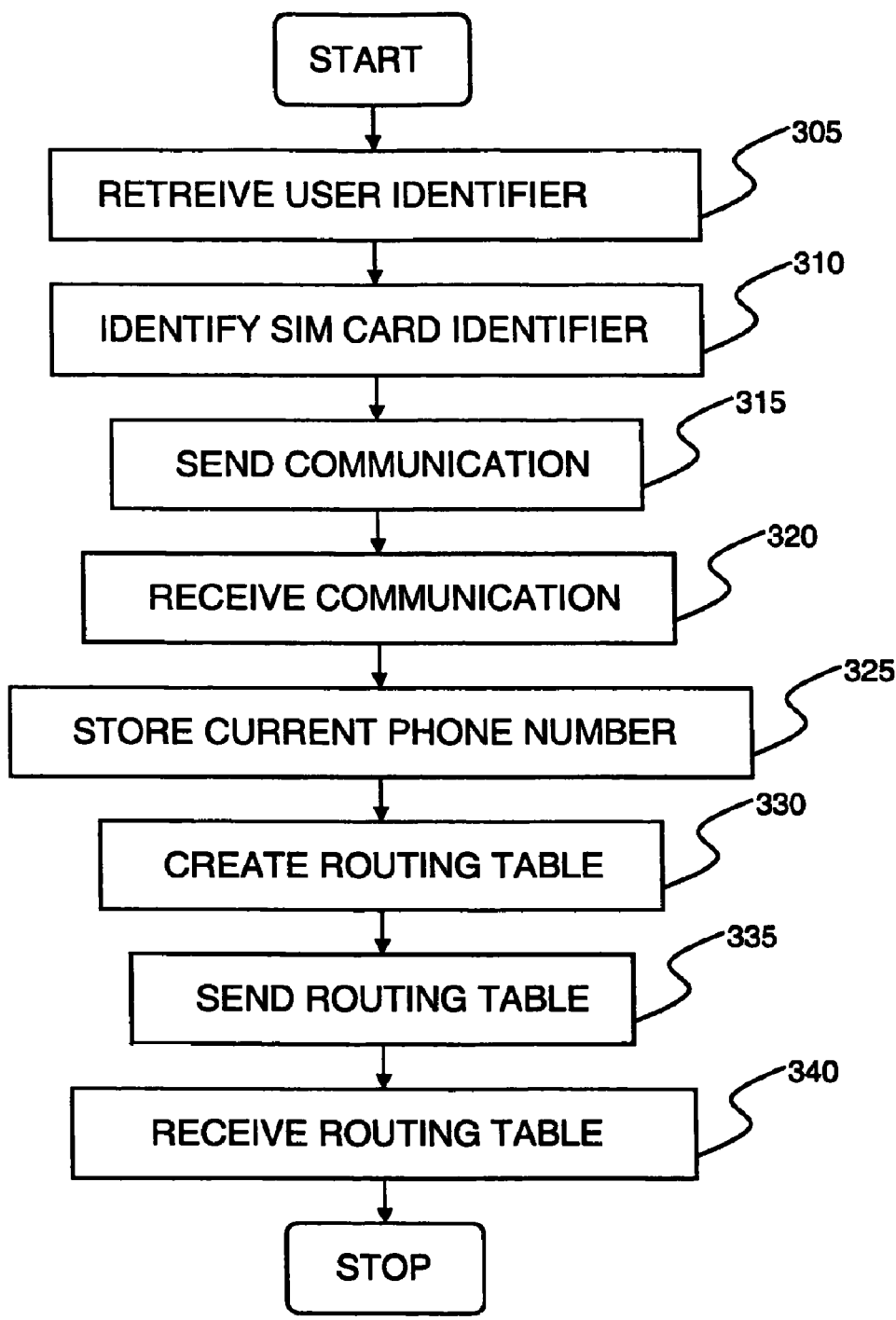
FIG. 3 shows a flow chart of an embodiment of a method according to the invention.

In FIG. 3 a flow chart of an embodiment of a method according to the invention is shown. In step 305 an identifier of a user of a mobile terminal is retrieved from memory. When a current SIM card is activated, an identifier of the current SIM card is identified in the mobile terminal in step 310. A communication indicating an association between the identifier of the user and the identifier of the current SIM card is sent to a communication server in step 315.

The user is associated with a default phone number in the communication server. The default number may e.g. be associated with the communication server directly or with a default SIM card of the user as described further below. The communication from the mobile terminal is received and interpreted in the communication server in step 320. A phone number associated with the current SIM card is identified and stored in the communication server as a current phone number of the user in step 325. Based on the current SIM card, a routing table indicating a preferred routing for establishing outgoing calls from the mobile terminal with the current SIM card is created in the communication terminal in step 330. When the current phone number of the user is different from the default phone number of the user, the routing table may e.g. indicate that outgoing calls from the mobile terminal should be established via the communication server.

The routing table is then sent from the communication server to the mobile terminal in step 335, and the routing table from the communication server is received and interpreted in the mobile terminal in step 340.

Furthermore, the creation, sending, receiving and interpreting of the routing table in the steps 330, 335 and 340 may be omitted. Instead, an alternative routing logic can be used in an application of the mobile terminal. Such an alternative routing logic can for example be governed by the current location of the mobile terminal.

Figure 4:
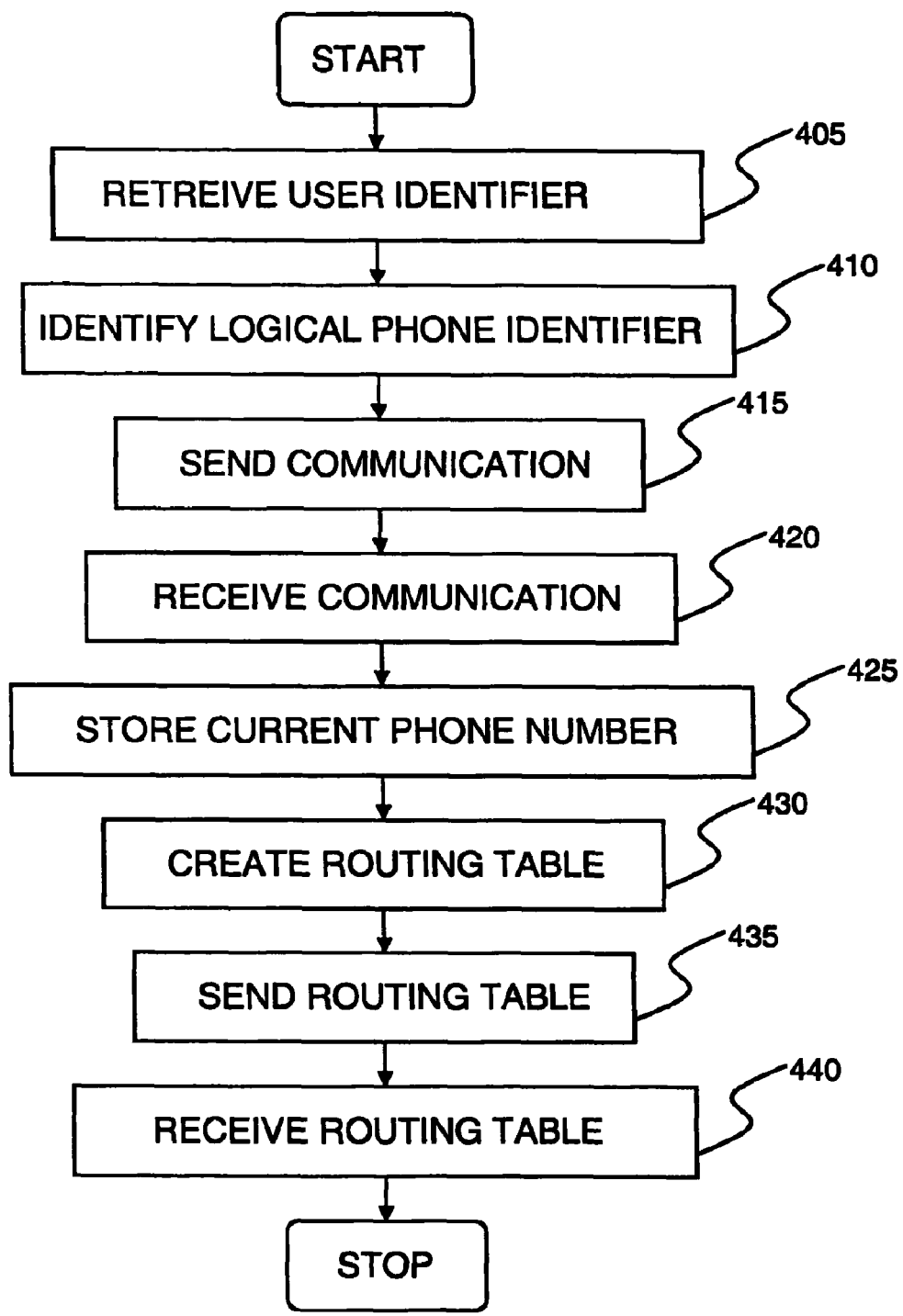
FIG. 4 shows a flow chart of another embodiment of a method according to the invention.

In FIG. 4 a flow chart of another embodiment of a method according to the invention is shown. In step 405 an identifier of a user of a mobile terminal is retrieved from memory. When a logical phone of two or more logical phones in the mobile terminal is activated for use, an identifier of a currently used logical phone is identified in the mobile terminal in step 410 as the logical phone activated for use. A communication indicating an association between the identifier of the user and the identifier of the currently used logical phone is sent to a communication server in step 415.

The user is associated with a default phone number in the communication server. The default number may e.g. be associated with the communication server directly or with a default logical phone of the user as described further below. The communication from the mobile terminal is received and interpreted in the communication server in step 420. A phone number associated with the currently used logical phone is identified and stored in the communication server as a current phone number of the user in step 425. Based on the currently used logical phone, a routing table indicating a preferred routing for establishing outgoing calls from the mobile terminal with the currently used logical phone is created in the communication terminal in step 430. When the current phone number of the user is different from the default phone number of the user, the routing table may e.g. indicate that outgoing calls from the mobile terminal should be established via the communication server.

The methods described with reference to FIG. 3 and FIG. 4, respectively, may be used separately or in combination.

In an example, a mobile terminal is used having two or more different capabilities for communication, e.g. GSM and WLAN. At call set up when a user dials a number, the number is compared with the routing table. The routing table then indicates the preferred way of setting up the call based on e.g. lowest cost. The alternative ways may then be:

a) Using GSM SIM card direct
b) Using GSM SIM card but routed through the routing server c) Using other logical phone present in the device, i.e. voice over IP application and WLAN network The routing table holds information of how the call setup to the routing server is to be performed, and fall-back methods in the case on method would fail, i.e. if voice over IP and WLAN network is preferred but fails, the next preferred alternative, e.g. GSM routed through the routing server, is selected.

Further to the above, the association of the user with the phone number associated with the current SIM card can be used for incoming calls to the user. Incoming calls are routed to the communication server, e.g. because the default phone number of a user is an extension number that always routes incoming calls to the communication server, or that the default SIM card subscription has a call divert rule that forwards calls on no answer to the communication server. The association of the user with the phone number of the current SIM card is then used in the communication server to route the call to the phone number associated with the current SIM card.

The invention claimed is:

1. A method for increasing subscription transparency for mobile terminal users, comprising:
    storing, in a mobile terminal, an identifier of a current subscriber identity module (SIM) card;
    storing, in the mobile terminal, an identifier of a user of the mobile terminal, the identifier of the user being stored separately from the SIM card;
    detecting the identifier of the current SIM card in the mobile terminal; and
    sending to a communication server, a communication registering an association between the identifier of the user and the identifier of the current SIM card.

2. The method according to claim 1, further comprising:
    receiving and interpreting a routing table from the communication server, the routing table indicating a preferred routing for outgoing calls.

3. The method according to claim 2, further comprising:
    receiving a request to establish an outgoing call from the mobile terminal to a called phone number; and
    establishing the outgoing call according to the preferred routing indicated by the routing table.

4. The method according to claim 3, further comprising:
    initiating the establishment of the call via a default route; and
    interrupting the establishment of the call via the default route.

5. The method according to claim 2, wherein the routing table from the communication server indicates the preferred routing for outgoing calls to be via the communication server.

6. The method according to claim 1, wherein the detecting is performed in response to the activation of the current SIM card.

7. The method according to claim 1, further comprising:
    selectively activating one of two or more SIM cards in the mobile terminal for use in communication, wherein the current SIM card is the currently activated SIM card.

8. The method according to claim 1, further comprising:
    selecting a network for roaming of a number of selectable networks, the selection being based on cost information stored in the mobile terminal for the number of networks and on the current SIM card.

9. The method according to claim 1, further comprising directing calls to a first phone number associated with the user identifier to the communications server and diverting the calls to a second phone number based on the association between the identifier of the current SIM card in the mobile terminal and the identifier of the user sent to the communication server.

10. The method according to claim 1, wherein the current SIM card is a loaner second SIM card different from a default first SIM card associated with the identifier of the user, and further comprising rewriting a calling party phone number to be displayed to a called party as a default phone number associated with the first SIM card when the call is placed from the mobile terminal having the second SIM card associated with the user identifier.

11. A mobile terminal for increased subscription transparency for users, comprising:
a current subscriber identity module (SIM) card;
a storage device separate from the SIM card and arranged to store an identifier of a user of the mobile terminal;
a detection device arranged to detect an identifier of the SIM card in the mobile terminal; and
a sending device arranged to send a communication to a communication server, which communication registers an association between the identifier of the user and the identifier of the current SIM card.

12. The mobile terminal according to claim 11, further comprising:
a receiving device for receiving and interpreting a routing table from the communication server, the routing table indicating a preferred routing of outgoing calls.

13. The mobile terminal according to claim 12, further comprising:
a user interface device arranged to receive a request to establish an outgoing call from the mobile terminal to a called phone number;
a call establishment device arranged to establish the call; and
a processing device arranged to instruct the call establishment device to establish the outgoing call via the preferred route indicated by the routing table.

14. The mobile terminal according to claim 13, wherein the call establishment device is arranged to initiate the establishment of the call via a default route, and wherein the processing device is further arranged to interrupt the establishment of the call via the default route.

15. The mobile terminal according to claim 12, wherein the detecting device is arranged to detect the identifier of the current SIM card in response to the activation of the current SIM card.

16. The mobile terminal according to claim 11, further arranged to receive two or more SIM cards, and to selectively activate one of the two or more SIM cards for use in communication, wherein the current SIM card is the currently activated SIM card.

17. The mobile terminal according to claim 11, further arranged to select a network for roaming of a number of selectable networks, the selection being based on cost information stored in the mobile terminal for the number of networks and on the current SIM card.

18. A method for increasing subscription transparency for mobile terminal users, comprising:
storing, in a mobile terminal, an identifier of a user of the mobile terminal;
detecting an identifier of a currently used logical phone in the mobile terminal; and
sending to a communication server, a communication indicating an association between the identifier of the user and the identifier of the currently used logical phone.

19. The method according to claim 18, further comprising:
receiving and interpreting a routing table from the communication server, the routing table indicating a preferred routing for outgoing calls.

20. The method according to claim 19, further comprising:
receiving a request to establish an outgoing call from the mobile terminal to a called phone number; and
establishing the outgoing call according to the preferred routing indicated by the routing table.

21. The method according to claim 20, further comprising:
initiating the establishment of the call via a default route; and
interrupting the establishment of the call via the default route.

22. The method according to claim 19, wherein the routing table from the communication server indicates the preferred routing for outgoing calls to be via the communication server.

23. The method according to claim 18, wherein the detecting is performed in response to the activation of the currently used logical phone.

24. The method according to claim 18, further comprising:
selectively activating one of two or more logical phones in the mobile terminal for use in communication.

25. The method according to claim 18, further comprising:
selecting a network for roaming of a number of selectable networks, the selection being based on cost information stored in the mobile terminal for the number of networks and on the currently used logical phone.

26. The method according to claim 18, wherein the logical phone is stored in the mobile terminal separate from the identifier of the user.

27. The method according to claim 18, wherein the logical phone includes at least one of a voice over Internet protocol application (VOIP) and a WLAN network.

28. The method according to claim 18, further comprising directing calls to a first phone number associated with the user identifier to the communications server and diverting the calls to a second phone number based on the association between the identifier of the currently used logical phone and the identifier of the user sent to the communication server.

29. A mobile terminal for increased subscription transparency for users, comprising:
a storage device arranged to store an identifier of a user of the mobile terminal;
a detection device arranged to detect an identifier of a currently used logical phone in the mobile terminal; and
a sending device arranged to send a communication to a communication server, which communication indicates an association between the identifier of the user and the identifier of the currently used logical phone.

30. The mobile terminal according to claim 29, further comprising:
a receiving device for receiving and interpreting a routing table from the communication server, the routing table indicating a preferred routing of outgoing calls.

31. The mobile terminal according to claim 30, further comprising:
a user interface device arranged to receive a request to establish an outgoing call from the mobile terminal to a called phone number;
a call establishment device arranged to establish the call; and
a processing device arranged to instruct the call establishment device to establish the outgoing call via the preferred route indicated by the routing table.

32. The mobile terminal according to claim 31, wherein the call establishment device is arranged to initiate the establishment of the call via a default route, and wherein the processing device is further arranged to interrupt the establishment of the call via the default route.

33. The mobile terminal according to claim 30, wherein the detecting device is arranged to detect the identifier of the currently used logical phone in response to the activation of the currently used logical phone.

34. The mobile terminal according to claim 29, further arranged to receive two or more logical phones, and to selectively activate one of the two or more logical phones for use in communication.

35. The mobile terminal according to claim 29, further arranged to select a network for roaming of a number of selectable networks, the selection being based on cost information stored in the mobile terminal for the number of networks and on the currently used logical phone.

36. The mobile terminal according to claim 29, wherein the logical phone is stored separate from the identifier of the user.

37. The mobile terminal according to claim 29, wherein the logical phone includes at least one of a voice over Internet protocol application (VOIP) and a WLAN network.

* * * * *